United States Patent
Staub et al.

[19]

[11] Patent Number: 6,092,834
[45] Date of Patent: Jul. 25, 2000

[54] AIRBAG MODULE

[75] Inventors: Andreas Staub, Sulzbach; Holger Maul, Gross-Zimmern, both of Germany

[73] Assignee: Breed Automotive Technology, Inc., Lakeland, Fla.

[21] Appl. No.: 09/226,090

[22] Filed: Jan. 5, 1999

[30] Foreign Application Priority Data

Feb. 5, 1998 [DE] Germany ............................ 198 04 579

[51] Int. Cl.[7] .................................................. B60R 21/16
[52] U.S. Cl. ........................................ 280/728.2; 280/736
[58] Field of Search .............................. 280/728.2, 728.3, 280/739, 738, 742, 736, 740, 731

[56] References Cited

U.S. PATENT DOCUMENTS

| 4,810,005 | 3/1989 | Fohl ........................................ 280/732 |
| 4,830,401 | 5/1989 | Honda ..................................... 280/736 |
| 4,913,461 | 4/1990 | Cuevas et al. ........................... 280/731 |
| 5,074,584 | 12/1991 | Jarboe et al. .......................... 280/743 |
| 5,358,270 | 10/1994 | Kuretake et al. ...................... 280/728 |
| 5,435,593 | 7/1995 | Hiramitsu et al. ................... 280/728.2 |
| 5,443,284 | 8/1995 | Strahl et al. ......................... 280/728.2 |
| 5,520,411 | 5/1996 | Lang et al. ........................... 280/728.3 |
| 5,542,692 | 8/1996 | Shaklik et al. ....................... 280/728.2 |
| 5,607,179 | 3/1997 | Lenart et al. ........................ 280/728.2 |
| 5,658,008 | 8/1997 | Herrmann et al. .................... 280/728.2 |
| 5,683,100 | 11/1997 | Enders et al. ....................... 280/728.2 |
| 5,709,401 | 1/1998 | Schenck et al. ..................... 280/728.2 |
| 5,709,402 | 1/1998 | Leonard et al. ..................... 280/728.2 |
| 5,829,777 | 11/1998 | Sakurai et al. ...................... 280/728.2 |

FOREIGN PATENT DOCUMENTS

| 4226231 | 2/1993 | Germany . |
| 4425328 | 1/1996 | Germany . |
| 4425495 | 1/1996 | Germany . |
| 0160756 | 6/1989 | Japan . |
| 2270882 | 3/1994 | United Kingdom . |
| WO94/25311 | 11/1994 | WIPO . |

*Primary Examiner*—Paul N. Dickson
*Attorney, Agent, or Firm*—Lonnie R. Drayer

[57] ABSTRACT

An airbag module has a gas generator. A gas generator support is connected to the gas generator. A cover is connected to the gas generator support. An airbag is arranged in a folded state between the gas generator, including the gas generator support, and the cover. The airbag is provided with an opening in which the gas generator including the gas generator support is installed. The airbag is further provided with passageways in the peripheral area of opening through which hooks or projections of the gas generator support and/or the cover engage extend.

6 Claims, 12 Drawing Sheets

AIRBAG MODULE

FIELD OF INVENTION

The present invention relates to an airbag module comprising an airbag, a gas generator, and an airbag cover wherein the airbag is provided with a sealing shield.

BACKGROUND OF THE INVENTION

Known airbag modules comprise an airbag and a gas generator with a plurality of components for fastening the airbag to the gas generator. Known airbags have an opening through which gases generated by a gas generator can be conducted to the airbag interior. The airbag is fastened to a housing by means of flanges and screws or clamping means. The gas generator is also fastened to the housing by means of screws or clamping means.

Such an airbag module is, for instance, known from WO 94-25311. Said airbag module comprises an airbag, a gas generator and additional fastening elements for fastening the airbag to the gas generator. The airbag has an opening through which the gas generator extends into the airbag interior. The periphery of the opening is clamped into an additional airbag holding ring. The airbag with the airbag holding ring is fastened between an additional fastening plate and a part of the housing together with a flange provided at the gas generator. Starting out from the housing clamping elements extend through the flange of the gas generator and the airbag by holding the additional holding plate. Thus, the gas generator and the airbag are retained between the holding plate and the housing through a clamping effect.

Said known airbag modules, therefore, include a plurality of individual components resulting in a laborious and time-consuming fabrication and high manufacturing costs. Moreover, a large number of individual components result in an increased weight of the airbag module.

SUMMARY OF THE INVENTION

It is the object of the invention to provide an airbag module which is simple and cost saving in its fabrication and which is easy to mount in a vehicle.

An airbag module according to the invention requires only three components, namely an airbag, a gas generator including a gas generator support fastened thereto, and a cover. The cover seals the airbag assembly towards the outside and encloses the folded airbag. The airbag is thereby arranged with the housing or the gas generator support by means of a simple connection. The cover and the gas generator support, too, are connected with each other by a simple connection. The reduced number of components decreases costs, and also the assembly is facilitated considerably since only a few components have to be joined together in an interlocking manner. This facilitates a considerably shorter assembly time and lowers assembly costs. In addition, the weight of such an airbag module can be reduced due the smaller number of components. Preferably both the airbag and the cover are fastened to hooks or projections of the gas generator support. This allows the assembly of the complete airbag module by means of a single connection since no additional fastening elements are required for fastening the cover.

A sealing shield is fastened to the inside of the airbag. The sealing shield closes the openings in the airbag except for one passage through which at least part of the gas generator extends into the interior of the airbag. The sealing shield can be pressed against the gas generator support and/or the gas generator by inflation gas from the gas generator to seal the airbag. This is a cost effective way of sealing the airbag in the area where it is fastened to the gas generator support, so that the airbag need not be clamped together with the gas generator support for bringing about a sealing effect. The sealing shield can, for instance, be made of a cloth or film layer of the same material as the rest of the airbag thereby serving as flame protection or heat shield at the same time. Such a sealing shield is preferably sewn together with the airbag; however, it can also be connected to the airbag using adhesive substances or in any other way. The sealing shield can preferably also be made of several layers. For example, a heat resistant layer can be provided on the top protecting the fastening area of the airbag against heat caused by hot inflation gas generated by the gas generator. Such a heat protection can also be obtained by means of a sealing shield completely made of a heat resistant material.

A sealing shield as described above is inexpensive to fabricate since only one additional seam in the airbag is required without any additional assembly. In contrast to known sealing methods the costs for fabrication and assembly are thereby considerably reduced.

The airbag is preferably fastened to the gas generator support in a positive manner such that the fastening of the airbag is secured by fastening the cover. This has the advantage that after mounting the cover the airbag is retained in a way that it cannot become detached from the gas generator support through concussion or the like. Since this securing is achieved without involving additional securing elements, a higher reliability is obtained together with the more facilitated assembly.

In another embodiment, both the airbag and the gas generator support are fastened to the hooks or projections of the cover. This permits an easier assembly since the airbag, the cover and the gas generator support are held together by means of a single connection. Furthermore, with this arrangement the airbag can be fastened to the cover prior to connecting the gas generator and the gas generator support with the airbag and the cover. This facilitates installation of the folded airbag in the cover.

The positive attachment of the airbag to the cover is advantageously effected such that it is secured by the gas generator support. This constitution of the connection ensures that once the gas generator support is mounted, i.e. the airbag module is completely assembled, the airbag can no longer detach itself from its fastened position. This arrangement does not require the use of additional securing elements for securing the airbag, wherein the number of components and thus the efforts and costs of the assembly are reduced. The reduced number of individual components and the facilitated mounting process additionally reduce the risk of a faulty assembly, whereby the reliability of the airbag module is increased.

According to another embodiment the cover is securely fastened to the gas generator support by means of additional connecting elements, particularly by bolts or rivets. Such additional securing prevents the cover from becoming detached from the gas generator support, for example, during transport or assembly. The cover cannot become detached from the airbag module through concussion or the like once the airbag module is assembled.

According to another embodiment the gas generator can be integrally formed with the gas generator support, or can be screwed, clamped, welded or glued to the gas generator support. The gas generator thereby forms a single component together with the gas generator support clearly facilitating assembly of the airbag module. The number of mounting steps for assembling the airbag module is reduced resulting in a reduction of time and costs for the assembly.

The cover and/or the airbag are preferably further secured by further bending the hooks after the airbag and the cover are fastened together. The hooks are bent in such a way that the cover and the airbag can no longer become detached from the hooks. In addition the cover and/or the airbag can be clamped to the hooks. The airbag and/or the cover are thereby securely connected with the gas generator support.

BRIEF DESCRIPTION OF THE DRAWINGS

The invention is hereinafter described in more detail by means of preferred embodiments by referring to the attached drawings in which.

DETAILED DESCRIPTION OF THE INVENTION

Figure 1:
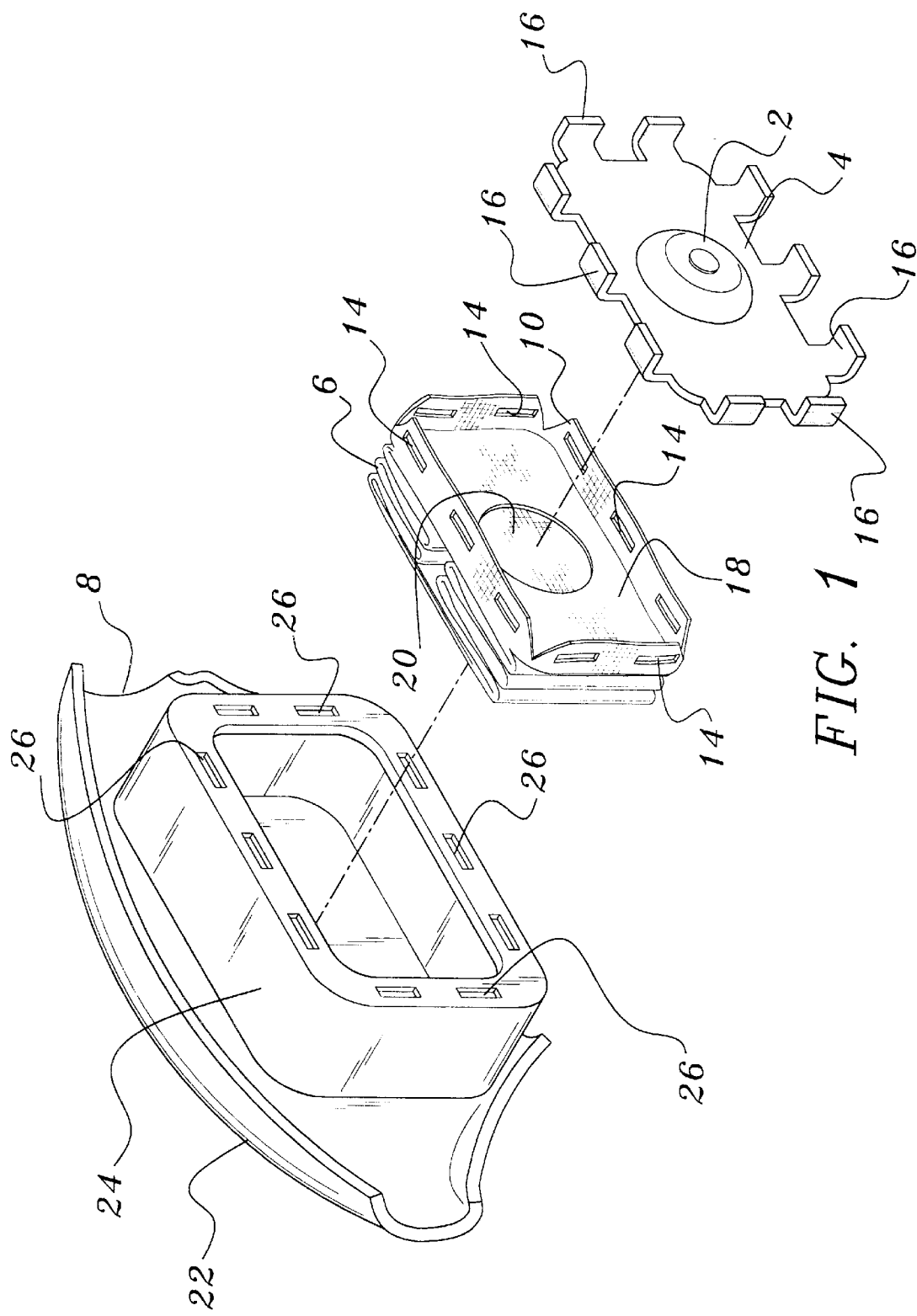
FIG. 1 shows an exploded view of a first embodiment an airbag module.

FIG. 1 is an exploded view, which shows the basic construction of an airbag module according to a first embodiment of the invention. The airbag module has a gas generator, a gas generator support 4 connected to the gas generator 2, an airbag 6 and a cover 8. The gas generator 2 has an essentially cylindrical shape and is arranged approximately in the center of the gas generator support 4 such that the gas generator support preferably extends in a flat manner, depending on the periphery of the gas generator. The gas generator support can, however, be deep drawn or shaped in any other way. The gas generator support 4 is preferably welded to the gas generator 2. Both parts can, however, be made integrally, for example of a piece of sheet metal.

Figure 2:
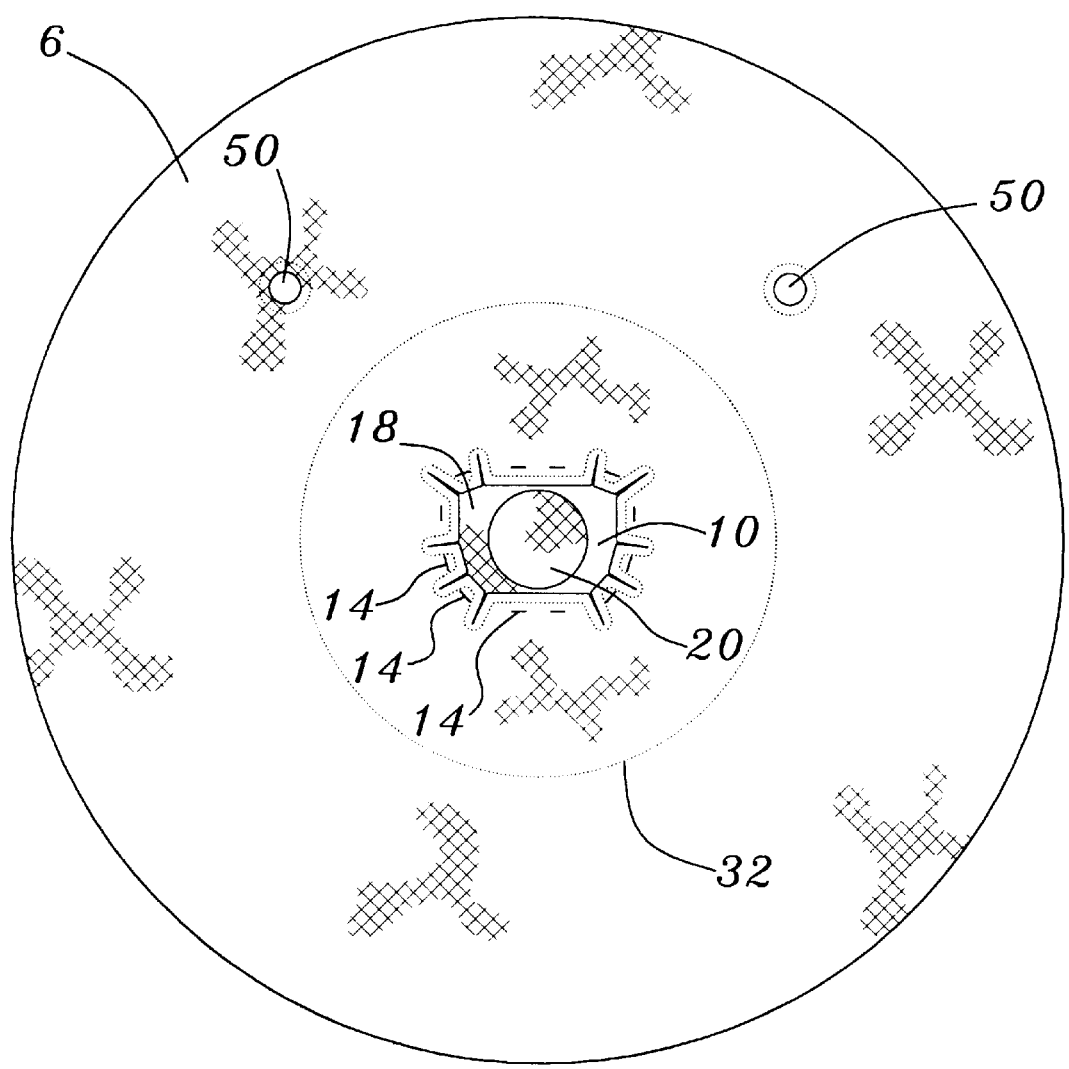
FIG. 2 shows a plan view of an airbag with a sealing shield for an airbag module according to the invention.

The airbag 6, as shown in plan view in FIG. 2, has an opening 10 into which the gas generator support 4 together with the gas generator 2 is inserted. Along the periphery of the opening 10 passageways 14, such as slits, are provided spaced from each other. Bent hooks 16 are located at the outer edges of the gas generator support 4, spaced from each other. The bent hooks 16 extend through the corresponding passageways 14 of the airbag 6 to fasten the airbag to the gas generator support. The bent hooks 16 are formed integrally with the gas generator support 4. After the assembly the hooks 16 can be further deformed or bent for additionally securing the airbag 6 and the cover 8. In addition, a sealing shield 18 is provided inside the airbag 6 and can freely move towards or away from the opening 10. This sealing shield 18 is made of an additional cloth layer sewn together with the airbag 6 at its periphery 32 and closes opening 10 except for one passage 20. The passage 20 is located approximately in the center of the opening 10 and is dimensioned to permit the gas generator 2 to extend at least partially through the passage 20 into the airbag 6. The sealing shield 18 is positioned between the gas outlet openings of the gas generator 2 and the gas generator support 4 so that it is pressed against the gas generator support 4 by the inflation gas to seal the airbag, as is described below.

The cover 8 comprises a cover plate 22 forming the outer surface of the airbag module and facing the vehicle occupant once the airbag module is installed. At its inside the cover plate 22 is provided with sidewalls 24 forming a rectangular frame in which the folded airbag 6 is disposed. The cover is made of a polymeric material that is flexible enough to allow the gas generator support to be pushed inside the cover and the hooks 16 manipulated through the passages 26 in the cover. The sidewalls 24 are provided with a flange having passageways 26 therethrough by means of which the cover 8 can be fastened to the gas generator support 4. Extending the corresponding hooks 16 of the gas generator support 4 through the passageways 26 completes fastening.

Figure 3:
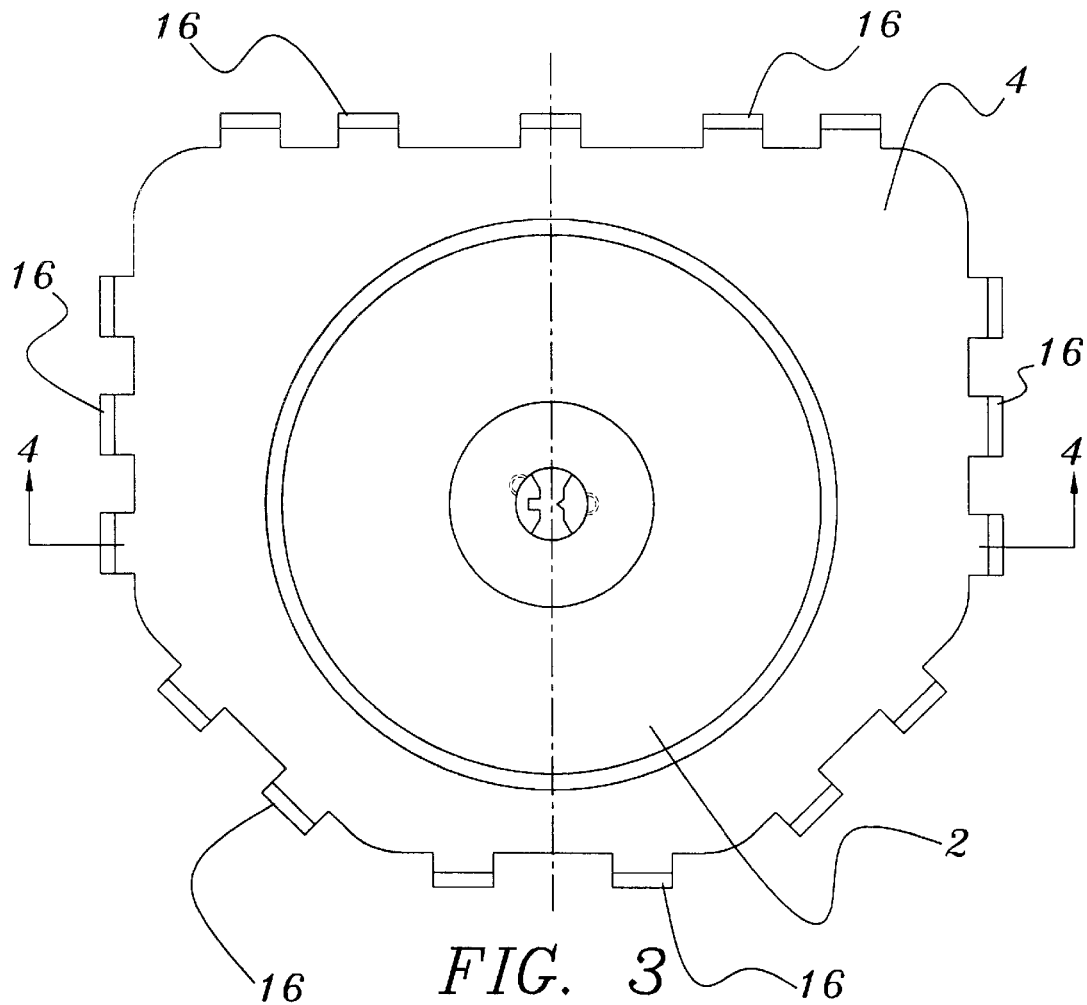
FIGS. 3 and 4 show a top view and a cross-sectional view, respectively, of a gas generator and gas generator support.
Figure 4:
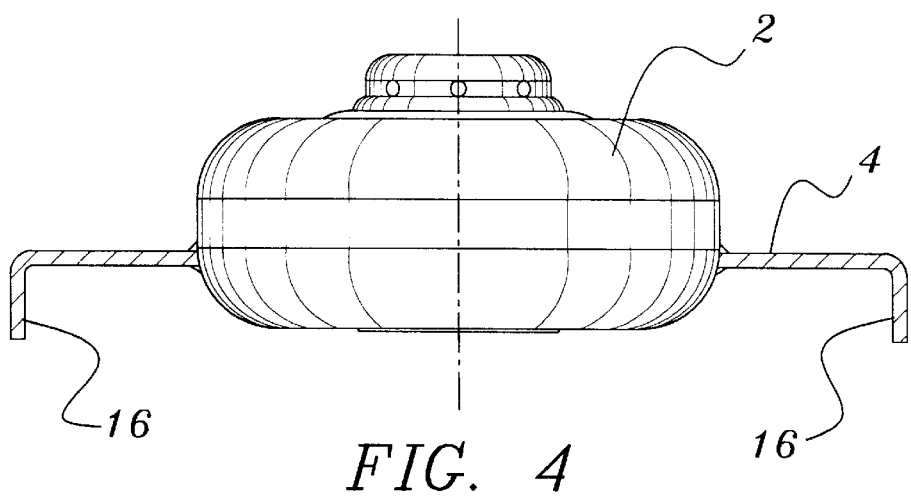

FIGS. 3 and 4 show a top view and a cross-sectional view, respectively, of the gas generator support 4 and gas generator 2 according to the above-described embodiment. In this embodiment the gas generator support 4 has an essentially rectangular shape with two flattened corners, however, depending on the place of installation the gas generator support can have any suitable shape, e.g. rectangular like in FIG. 1, without changing its mode of operation. It can be seen from the cross-section of FIG. 4 that of gas generator support 4 including gas generator 2 that the gas generator support is welded to the gas generator 2. L-shaped hooks 16 are formed at the periphery of the gas generator support to extend through the corresponding passageways of the airbag. The gas generator support is advantageously made of a metallic sheet allowing to be welded to the gas generator; however, it can alternatively be made of plastic.

Figure 5:
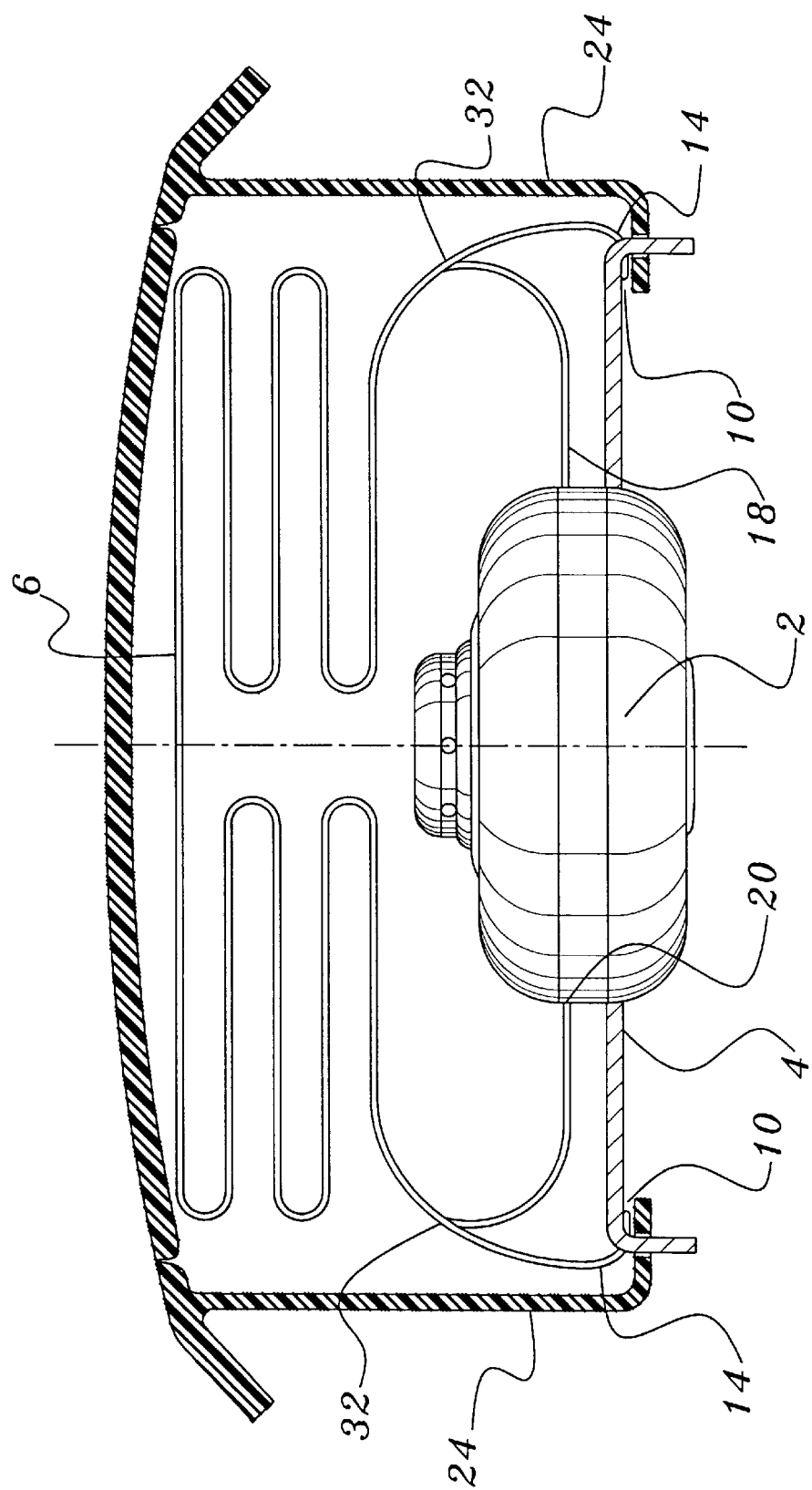
FIG. 5 shows a section through driver's side airbag module according to the invention.

The embodiment of the invention shown in FIG. 5 corresponds to the embodiment illustrated in FIG. 1. The sealing shield 18, which when looking at it from opening 10 is positioned further inside, is fastened by seams 32 to the inside of the airbag 6. The sealing shield 18 has a passage 20 through which the gas generator 2 extends at least partially into the interior of the airbag 6. In the interior of the airbag 6 sealing shield 18 covers the fastening areas with passageways 14 and the area of gas generator support 4. When the airbag is filled with gases generated by gas generator 2, the sealing shield 18 is pressed against the gas generator support 4 by the gas pressure, whereby the airbag 6 is sealed in the area of joint 10.

Figure 6:
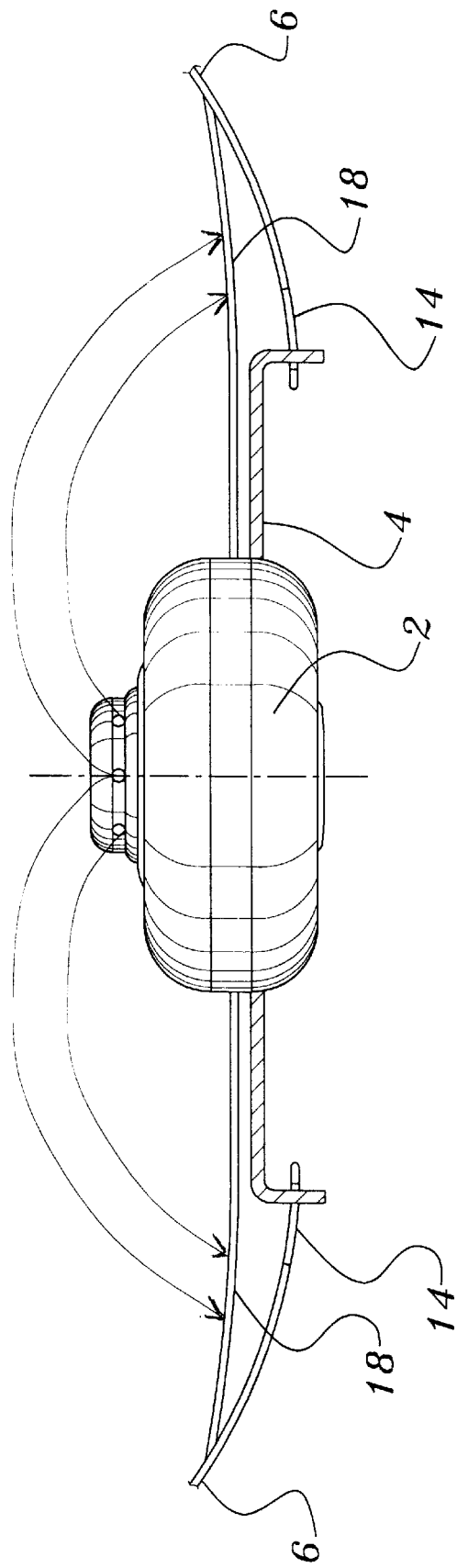
FIG. 6 shows a schematic diagram of the operation of the sealing shield.

The sealing function of sealing shield 18 is illustrated in FIG. 6. Gas inflating the airbag and pressing against the sealing shield 18 is indicated by the arrows in FIG. 6.

Figure 7:
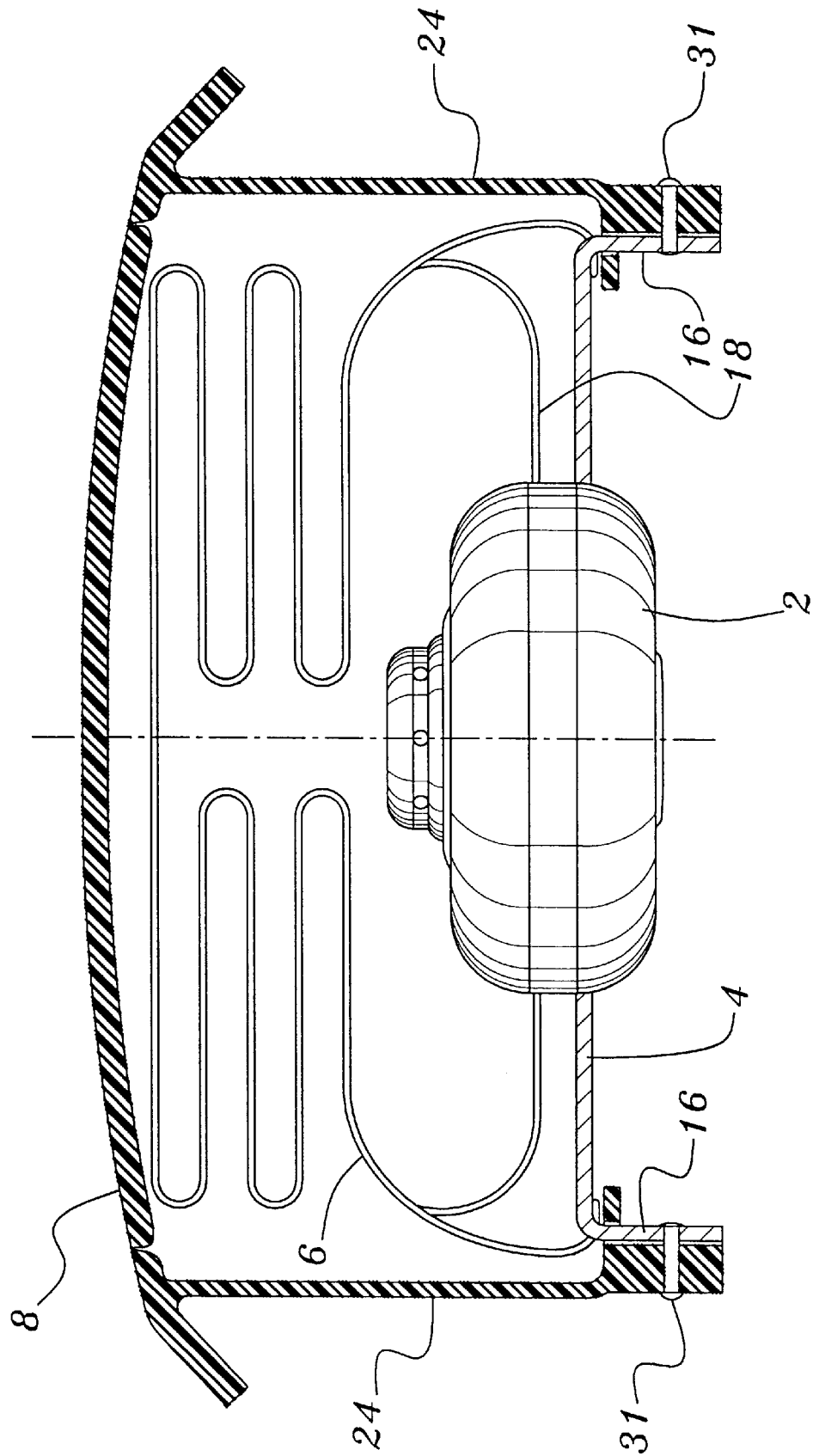
FIG. 7 shows a section through another driver's airbag side module according to the invention.

FIG. 7 shows an alternative embodiment of the invention, wherein the cover 8 is secured to the gas generator support 4 by means of rivets 31. Like in the embodiment of FIG. 5, the gas generator support is provided with hooks 16 at its outer periphery extending through passageways in the airbag 6. At their end facing away from the cover plate 22 the sidewalls 24 of cover 8 are provided with a portion 29 bent toward the inside, in which passageways 26 for receiving the hooks 16 are provided for attaching the cover 8. In addition, the sidewalls 24 of cover 8 are extended over the bent portion 29 so that a portion is parallel to hooks 16. The portion of the sidewalls that contacts the hooks 16 is connected to the hooks by means of rivets 31. Thus, the cover is additionally secured to the gas generator support. It is thereby no longer possible for the cover to become unintentionally detached from the gas generator support, for example, during transport or assembly. Since the airbag is already securely fastened to the gas generator support by means of the cover, the complete mounted airbag module is securely held together.

Figure 8:
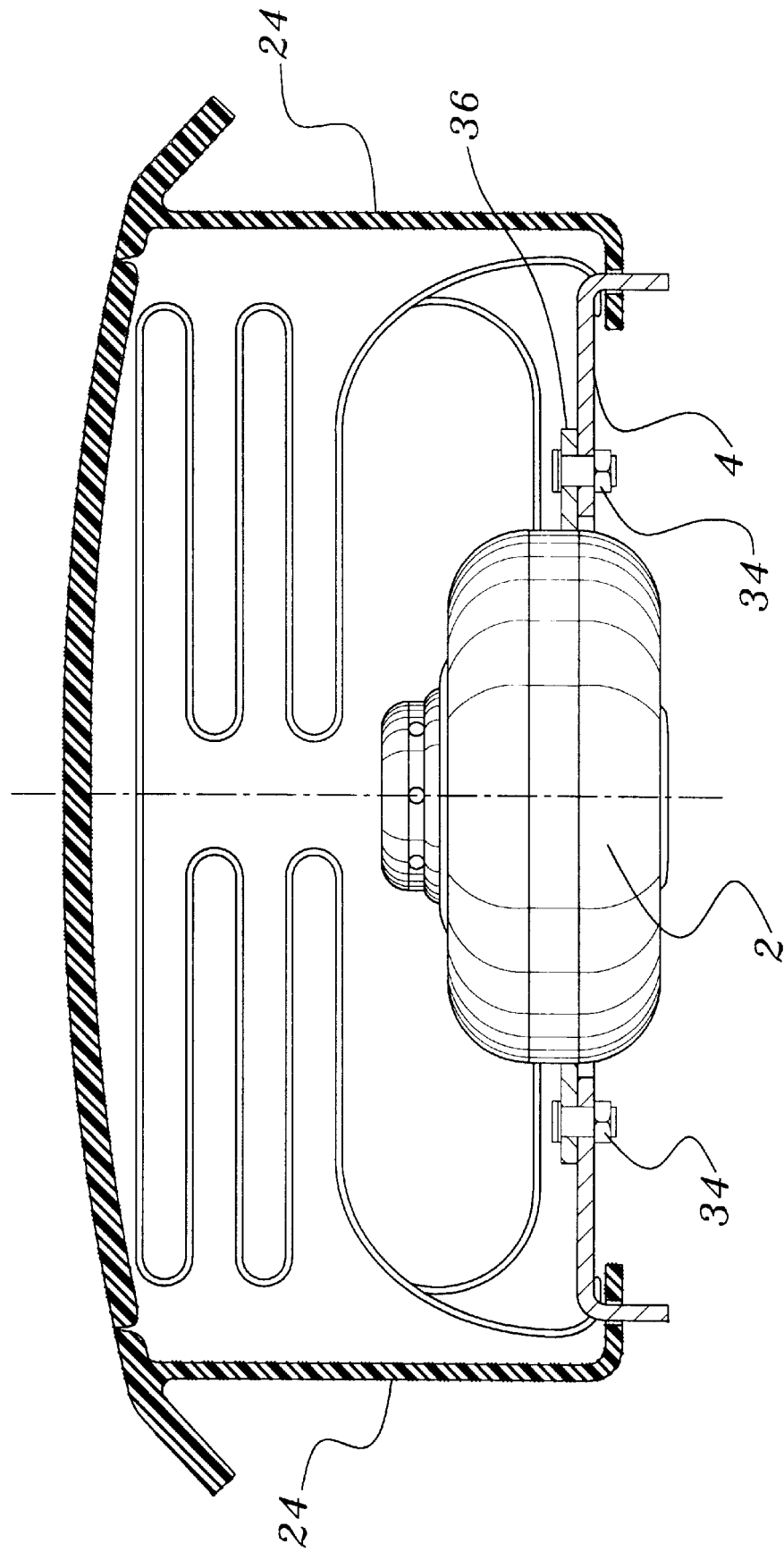
FIG. 8 shows a section through another driver's side airbag module similar to the embodiment according to FIG. 5.

FIG. 8 shows a modification of the embodiment shown in FIG. 5. In this embodiment the gas generator support 4 is not welded to the gas generator 2, but is fastened by means of nuts and bolts 34. For this purpose gas generator 2 is provided with a fastening flange 36 at its periphery which is contacted by the ring-shaped gas generator support 4. The fastening flange 36 is firmly connected to the gas generator support 4 by means of nuts and bolts 34. Instead of the nuts and bolts other suitable fastening method can be used for connecting the fastening flange 36 with the gas generator support, for instance by rivets.

Figure 9:
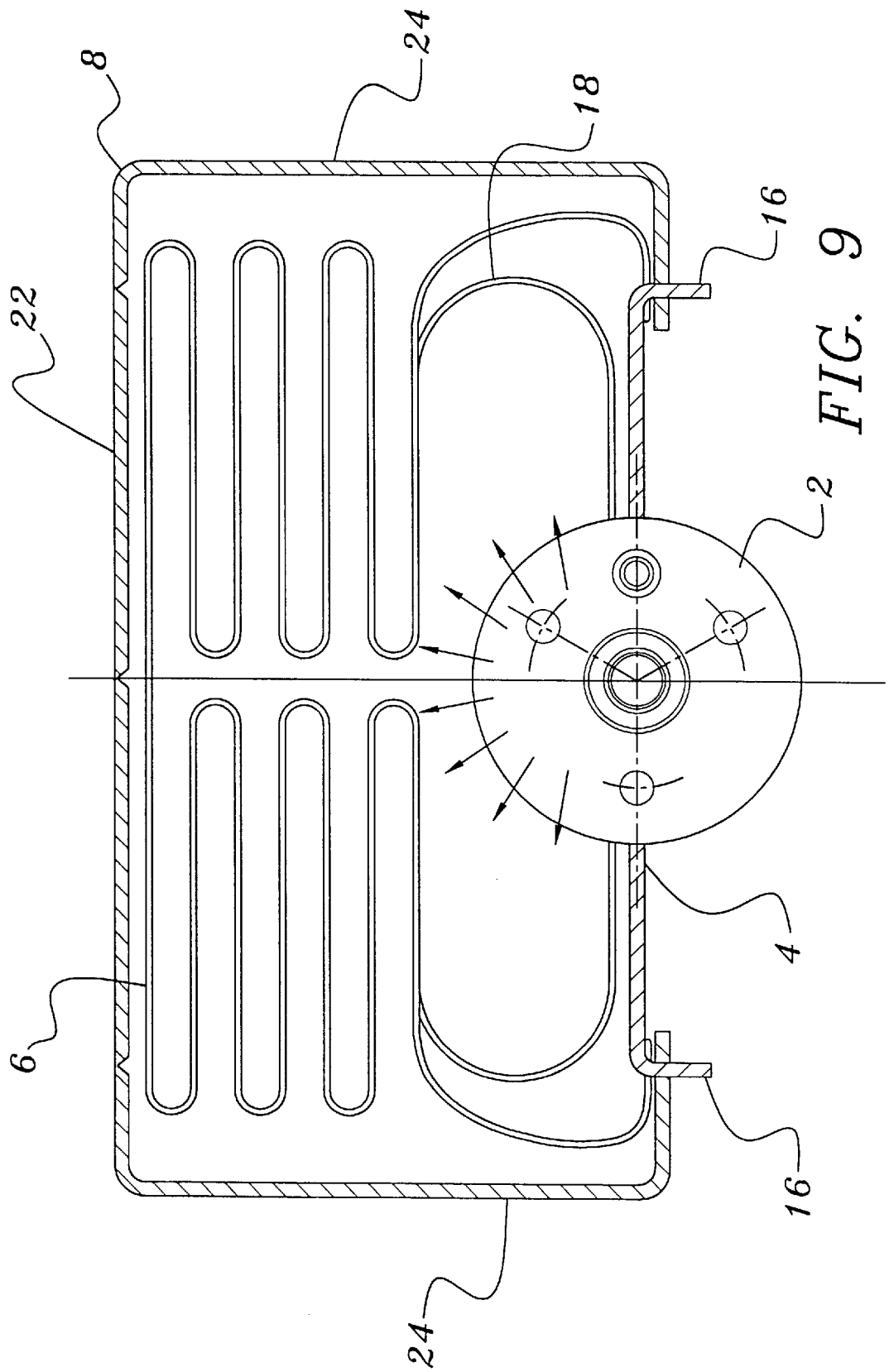
FIG. 9 shows a section through a front seat passenger or side airbag module corresponding to the embodiment shown in FIG. 5.

FIG. 9 shows, in section, a front seat passenger or side airbag module. This airbag module differs from the above-described embodiments primarily through the shape of the gas generator 2. In this embodiment the gas generator 2 has a tubular shaped housing with a longitudinal axis which extends parallel to the gas generator support 4 and the face 22 of cover 8. The gas generator support is welded to the gas generator and has bent hooks 16 at its outer edges. During the assembly first the airbag 6 and then the cover 8 are fastened to said hooks 16. Like with the already described embodiments, the folded airbag 6 is positioned between the gas generator support 4, including the gas generator 2, and the cover 8 which completely encloses the airbag 6 with its sidewalls 24. In this embodiment, too, a sealing shield 18 is provided in the interior of the airbag 6, as was explained with reference to FIGS. 5 and 6.

Figure 10:
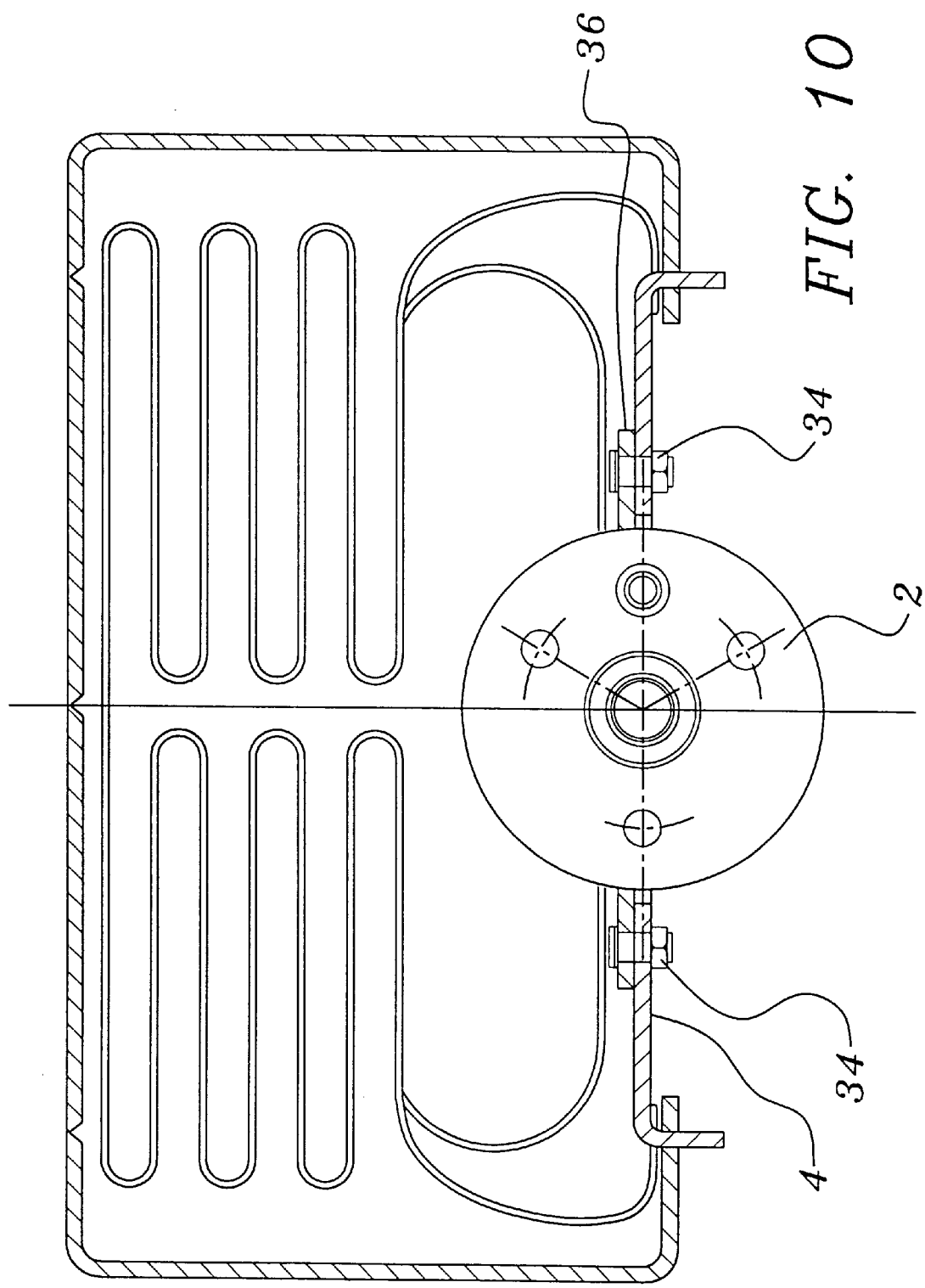
FIG. 10 shows a section through another front seat passenger or side airbag module similar to the embodiment shown FIG. 9.

FIG. 10 shows a further embodiment of a front seat passenger or side airbag module. Said airbag module substantially corresponds to the airbag module shown in FIG. 9. However, according to this embodiment the gas generator support 4 is not welded to the gas generator 2, but is connected thereto by means of nuts and bolts 34. Like the gas generator shown in FIG. 8 the gas generator is provided with a fastening flange 36.

Figure 11:
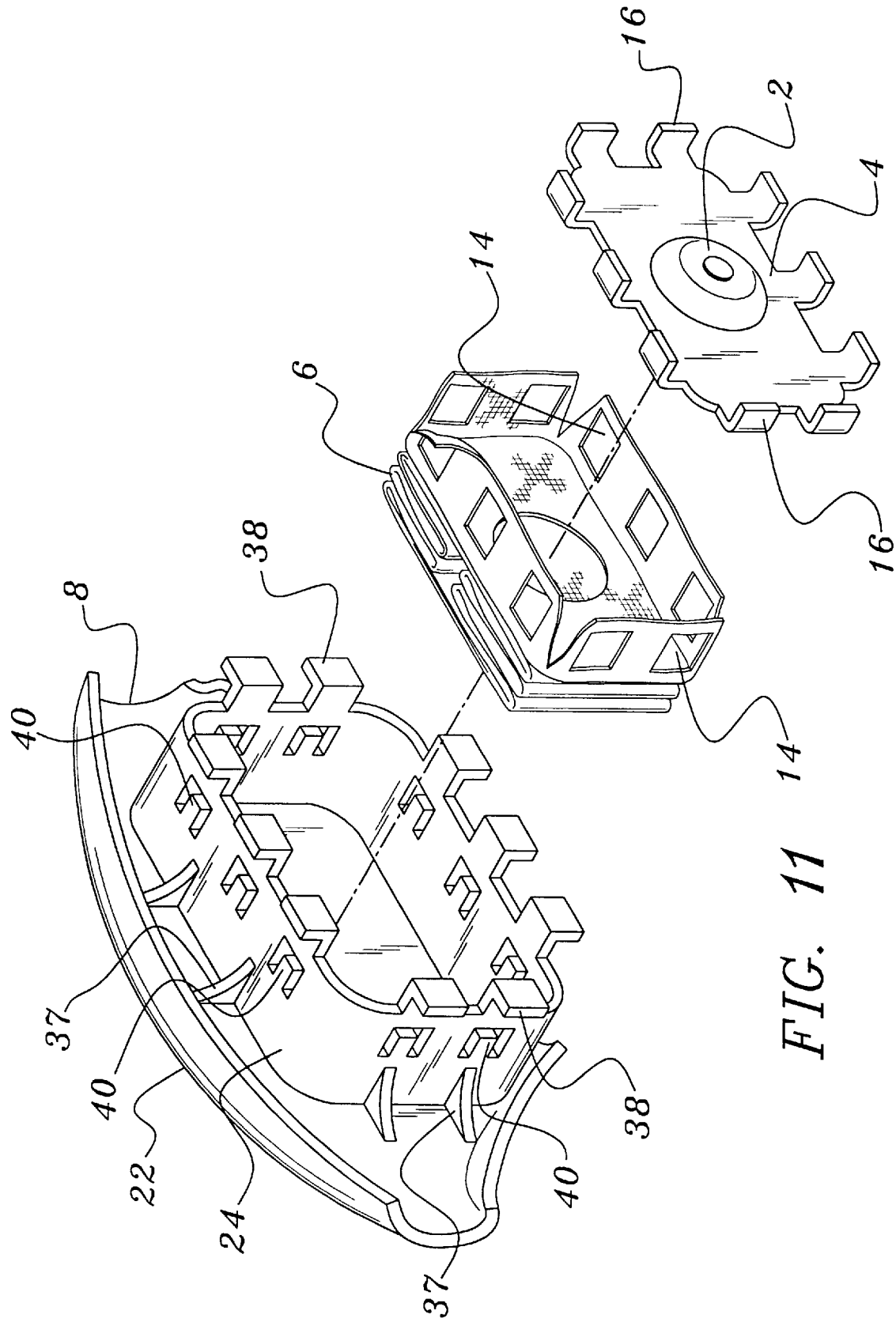
FIG. 11 shows an exploded view of an airbag module according to another embodiment.

FIG. 11 shows another embodiment of the invention, wherein the airbag 6 is not fastened to the gas generator support 4, but rather to the cover 8. The gas generator support 4 is basically configured as is shown in the embodiment according to FIG. 1. The gas generator support 4 is substantially rectangular and the round, cylindrical gas generator 2 is situated approximately in the center thereof. The gas generator support extends around the gas generator and is welded to gas generator. Essentially perpendicularly bent hooks 16 are provided spaced from each other at the outer periphery of the gas generator support 4. The hooks 16 are advantageously made integrally with the gas generator support 4 by means of forming, for example from sheet metal. The cover 8 is provided with a cover plate 22, which, for example in a driver's airbag module, forms the outer cover of the steering wheel. At the rear side of the cover plate the cover 8 has sidewalls 24 in the form of an essentially rectangular frame. The sidewalls are integrally made with the cover plate, for example, by means of injection molding. The cover can also be composed of several parts or be produced through multiple component injection molding. In addition, reinforcing ribs 37 are provided in the connection area between cover plate 22 and sidewalls 24. At the side facing away from the cover plate 22 the sidewalls 24 are provided with hooks 38 spaced from each other, which are bent towards the outside perpendicularly in an L-shape manner. Said hooks 38 can extend through the passageways 14 of the airbag 6, which substantially correspond to the embodiment shown in FIG. 1. Additionally, passageways 40 are provided in the sidewalls 24 of the cover 8 through which the corresponding hooks 16 of the gas generator support 4 can extend. Thus, during assembly the hooks 38 of the cover 8 extend through the passageways 14 of the airbag 6. Subsequently, the cover with the airbag fastened thereto is connected with the gas generator support 4. For this purpose the hooks 16 of the gas generator support 4 are equally guided through the passageways 14 in the airbag and through the passageways 40 in the sidewalls of cover 8. This additionally secures the airbag 6 to the cover 8, since it cannot become detached from hooks 38 as long as the gas generator support 4 extends through the passageways 40 in cover 8.

Figure 12:
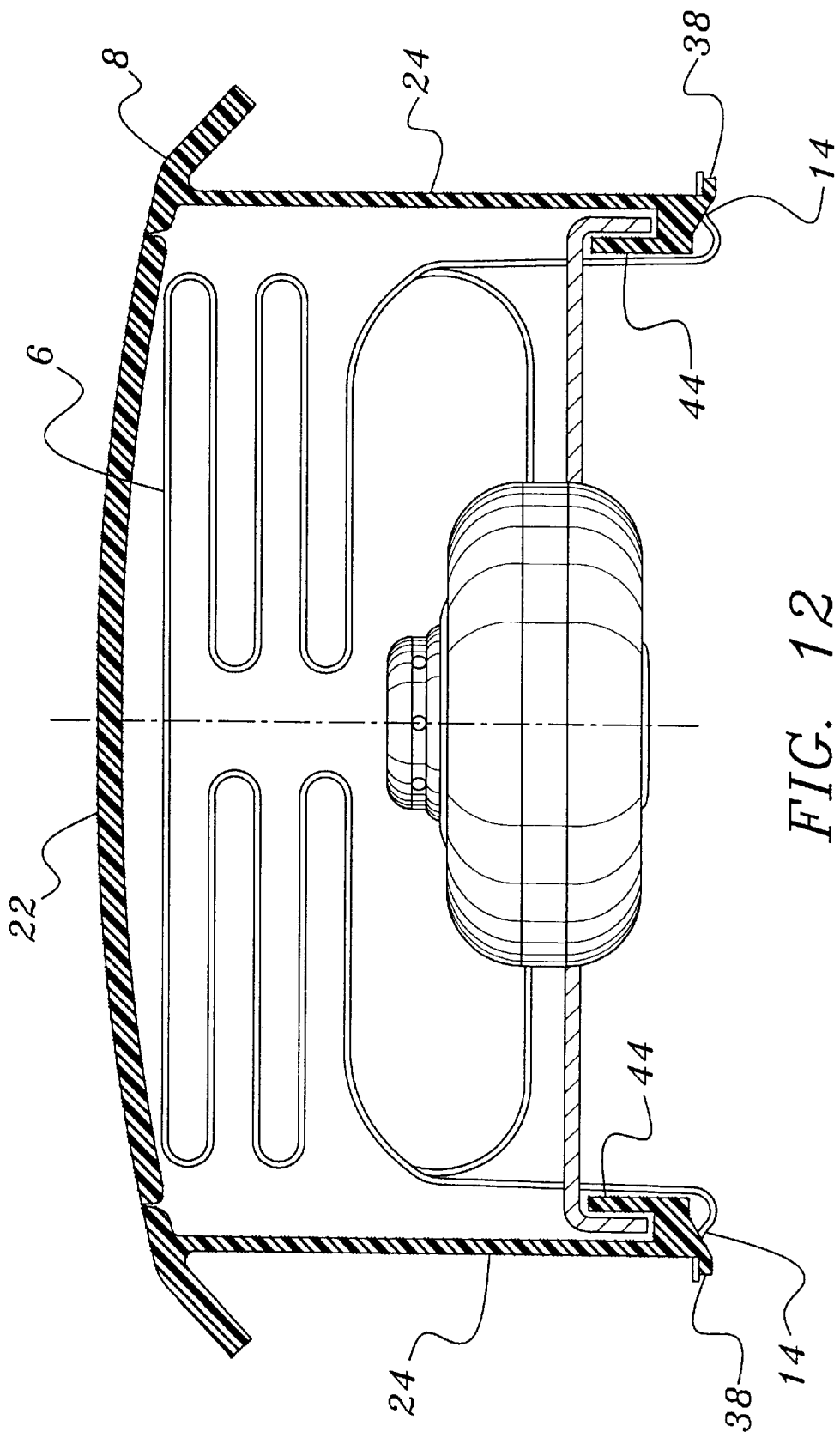
FIG. 12 shows a section through a driver's airbag module according to a another embodiment.

FIG. 12 shows a further embodiment of the inventive airbag module. This embodiment has a cover 8 with hooks 38 formed at the edges of its sidewalls 24, like in FIG. 11, which extend through the passageways 14 of the airbag 6. Additionally, the sidewalls 24 are provided with U-shaped hooks 44 directed towards the inside at their end remote of the cover plate 22. The hooks of the gas generator support are hooked into said hooks 44. The hooks of the gas generator support thereby extend through passageways in the airbag 6 so that the fastening thereof to the cover 8 is additionally secured.

Figure 13:
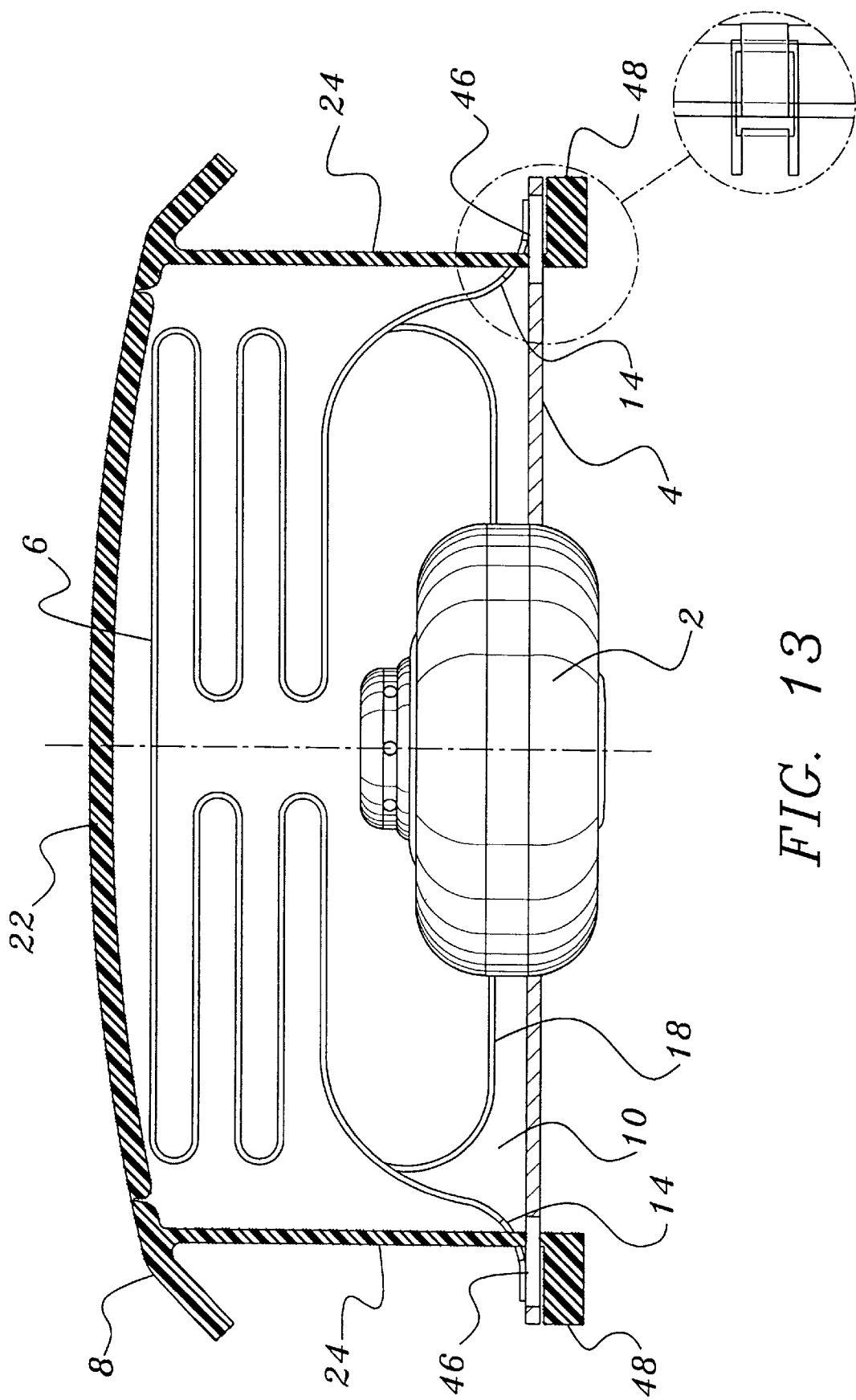
FIG. 13 shows a section through a driver's side airbag module according to another embodiment.

Another embodiment of the airbag module is illustrated in FIG. 13. The gas generator 2 corresponds essentially to the gas generators of the above-described driver's airbag modules. The flat gas generator support 4 extends from the periphery of the gas generator 2. The gas generator support 4 is provided with passageways 46 near its outer edges. The sidewalls 24 of the cover 8 have hooks 48 which are bent essentially perpendicularly towards the outside at their end opposite the cover plate 22. Said hooks 48 extend through the corresponding passageways 46 in the gas generator support 4. Like the above described embodiments the folded airbag 6 is arranged between the cover plate 22 and the gas generator 4, wherein it is enclosed by the sidewalls 24 of the cover 8, and is provided with passageways 14 near the periphery of the opening 10. Said passageways 14 are hooked into the hooks 48 of cover 8 so that the airbag 6 is securely retained at cover 8. During the assembly the airbag 6 is first hooked into the hooks 48 of cover 8 prior to engaging the hooks 48 in the passageways 46 through the gas generator support 4. This secures the airbag 6 to the cover 8 by means of the gas generator support 4. An unintended detachment of airbag 6 from cover 8 is thus not possible as long as the gas generator support 4 engages the hooks 48 of cover 8 via its passageways 46. Moreover, in this embodiment too, a sealing shield 18 is provided in the interior of the airbag 6, as is explained in the preceding embodiments.

Many changes and modifications in the above described embodiments of the invention can, of course, be carried out without departing from the scope thereof. Accordingly, that scope is intended to be limited only by the scope of the appended claims.

What is claimed is:

1. An airbag module comprising:

a gas generator;

a gas generator support connected with the gas generator;

a cover connected with the gas generator support; and an airbag, which is arranged in a folded state between the gas generator support and the cover, said airbag having an opening therein in which the gas generator and the gas generator support is installed, and with passageways near the periphery of said opening into which hooks of at least one of the gas generator support and the cover extend, wherein a sealing shield is fastened to the inside of the airbag, said sealing shield closes the opening in the airbag except for one passage, through which at least part of the gas generator extends into the interior of the airbag, and wherein the sealing shield is pressed against the gas generator support or the gas generator by inflation gas from the gas generator for sealing the airbag, the airbag and the cover are fastened by either the hooks or projections of the gas generator support.

2. The airbag module according to claim 1 wherein the fastening of the airbag to the cover is secured by the gas generator support.

3. The airbag module according to claim 1 wherein the cover is secured at the gas generator support by additional connecting elements.

4. The airbag module according to claim 2 wherein the cover is secured at the gas generator support by additional connecting elements.

5. The airbag module according to claim 1 wherein the cover is further secured by bending the hooks.

6. The airbag module according to claim 1 wherein the cover and the airbag are further secured by bending the hooks.

* * * * *